April 17, 1945.    H. C. FLINT    2,373,751
SEAT CONSTRUCTION
Filed Nov. 5, 1941    3 Sheets-Sheet 1

April 17, 1945.  H. C. FLINT  2,373,751
SEAT CONSTRUCTION
Filed Nov. 5, 1941  3 Sheets-Sheet 2

Inventor.
Hyland C. Flint.
By Thiess, Olson & Mecklenburger
Attys.

April 17, 1945.　　　H. C. FLINT　　　2,373,751

SEAT CONSTRUCTION

Filed Nov. 5, 1941　　　3 Sheets-Sheet 3

Patented Apr. 17, 1945

2,373,751

UNITED STATES PATENT OFFICE 2,373,751

SEAT CONSTRUCTION

Hyland C. Flint, Ann Arbor, Mich., assignor to The Syncro-Seat Company, a corporation of Michigan Application November 5, 1941, Serial No. 417,900

30 Claims. (Cl. 155—53)

This invention relates to a seat construction and has special reference to a seat of the so-called unison type for use in chairs, davenports, vehicles of various types, such as trucks, tanks, automobiles, or in any other constructions wherein it is desired to provide a synchronization of the substantially vertical movement of the back rest with the seat in order to effect a somewhat floating support for the user.

More particularly this invention relates to a seat construction comprising a rigid support, a plurality of resilient members for resisting a vertically disposed weight and a substantially vertically extending back rest frame arranged so as to be supported by the resilient members and to move vertically therewith. A fixed upright is provided at the rear of the seat and means are disposed between the upright and the back rest frame for resisting rearward movement of the back rest frame and for permitting vertical movement thereof with respect to the fixed support responsive to the movement of the resilient members. Preferably the resilient members employed are yielding strips comprising wires having substantially horizontally extending undulations with the strips being normally upwardly arched. These strips preferably extend longitudinally of the seat, that is, from front to back, and have their ends fixed to the rigid support.

Forwardly extending members connected to the back rest frame at the lower side portions thereof so as to move vertically with said frame lie adjacent the outer yielding strips. A saddle member is carried by these forwardly extending members and overlies the yielding strips. Thus, depression of the saddle member is retarded by the resilient strips, and as the saddle member is carried by the forwardly extending members connected to the back rest frame, said frame moves vertically with the saddle and is in effect supported by the yielding strips.

In order to provide what may be termed a selective action, the two outside yielding strips are preferably raised above the remaining strips. Consequently these two strips at first retard depression of the saddle, and as the saddle continues its downward movement the other yielding strips are brought into play. This effect may be graduated by arranging successive inner yielding strips below their next adjacent outer strips. Such arrangement also permits the saddle to shape itself to the person using the seat when the saddle is made of flexible material.

The means between the upright and the back rest frame for resisting rearward movement of said frame, while permitting vertical movement thereof responsive to the movement of the resilient members, comprise rocker spring assemblies of the general type disclosed in my prior Patent No. 2,163,751, dated June 27, 1939.

The present construction results in movement of the back rest frame substantially to the extent of movement of the saddle member, which is positioned over practically the central portions of the yielding strips, this being the section of greatest movement thereof. At the same time the back rest frame is disposed at the rear of the seat. Moreover, the only connection between the back rest frame and the yielding strips or other resilient members is through the saddle member, which provides for a softer action and longer wear of the resilient members.

The back and the seat are provided with a pad, over which there is a covering, which is substantially air tight. In order to further control the movement of the seat, the bottom is also enclosed, and a valve is arranged therein. The valve has a valve closing mechanism which opens to permit escape of air upon depression of the seat, but automatically closes to retard the raising of the seat. Resilient means connect the valve closure member with the yielding strips or other spring members and act to maintain the valve in closed position. Thus, when the seat is depressed the tension on the resilient member is lessened and the valve will be readily opened to permit escape of the air, but as soon as the yielding strips or springs move upwardly again, tension on the resilient member increases and the valve is quickly closed and retained in closed position.

One of the objects of this invention is to provide a seat construction of the character indicated above, which is comparatively inexpensive to assemble, standardized as to parts and is flexible as to dimensional changes.

Another object of this invention is to provide a seat construction of the above indicated type in which means are employed to resist rearward movement of the back rest frame while permitting vertical movement thereof.

A further object of the invention is to provide a seat construction of the character noted above, wherein the connection between the back rest frame and the seat is substantially forwardly of the back rest frame and opposite the portion of greatest movement of the seat.

It is a still further object of this invention to provide a seat of the construction hereinabove noted wherein the connection between the forwardly extending members connected to the back rest frame and the resilient members of the seat is through a saddle member.

Another object of the present invention is to provide a seat of the construction hereinabove noted wherein the forwardly extending members connected to the back rest frame constitute sides for the seat, and the saddle member is connected to the side members.

It is also an object of the present invention to provide a seat construction of the above indicated type in which the back rest frame is pivotally connected to the saddle-carrying forwardly extending side members.

Still another object of the present invention is to provide a seat of the above described character, wherein an air cushion is employed to retard the movement of the seat, and valve means are employed which open upon depression of the seat and automatically close when the seat moves upwardly.

Further objects and advantages will be apparent from the following description when considered with the drawings in which.

Figures 1, 4:
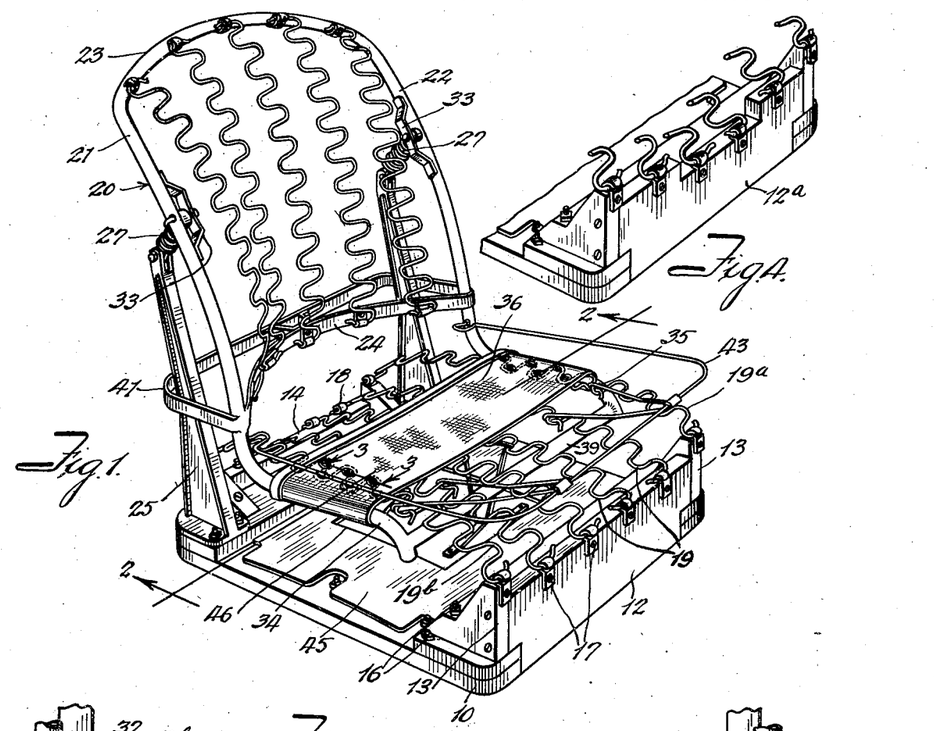
Fig. 1 is a perspective view of a seat construction embodying the features of this invention, the resilient pad and trim being removed therefrom.
Fig. 4 is a perspective view of a modified form of rigid support for mounting the yielding strips with the outermost strips above and the innermost strips below the others.
Figures 2, 3:
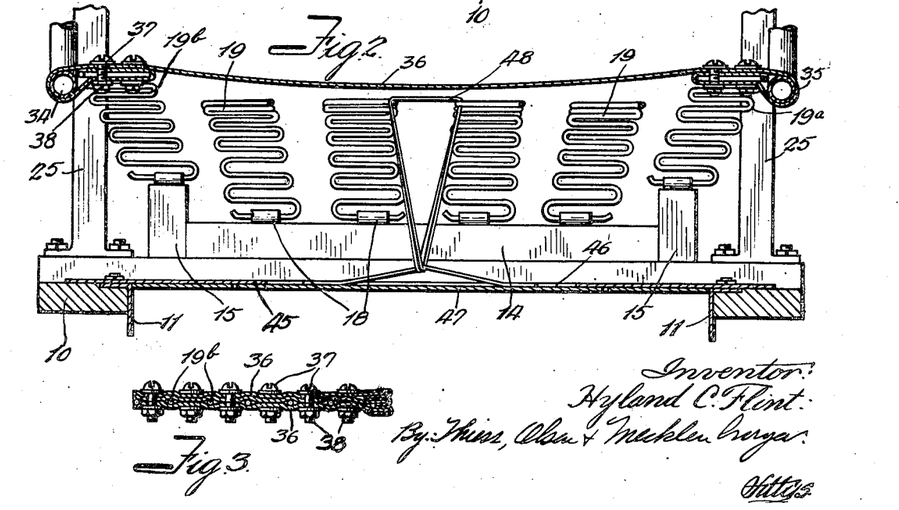
Fig. 2 is a partial vertical cross sectional view taken on the line 2—2 of Fig. 1.
Fig. 3 is a cross sectional view taken on the line 3—3 of Fig. 1 showing the means of mounting the saddle member.

Referring to the drawings and more particularly to Figs. 1 to 3, inclusive, there is shown the seat construction of the present invention in a form which is particularly suitable for use in automotive vehicles, although the construction may be readily adapted for various other uses.

A base 10 is provided for resting on a supporting surface, the base being substantially rectangular and being formed of wood or other easily worked material, preferably reinforced with metallic reinforcing members such as the angle irons 11. Mounted at the front of the base 10 is a rigid support comprising a central portion 12 and end portions 13, the latter extending upwardly above the central portion 12. A second rigid support is provided at the rear of the base 10. This also comprises a central portion 14 and end portions 15 which extend upwardly above the central portion. The rigid supports may be secured to the base 10 by any suitable means, such as bolts 16.

A plurality of spaced clips 17 are secured to the upper face of the front rigid support and complementary clips 18 are mounted on the rear rigid support. These clips or hooks 17 and 18 are shaped to form an outwardly opening channel for receiving the ends of yielding strips 19.

The yielding strips 19 extend between complementary sets of the clips 17 and 18, the strips being spaced horizontally and vertically as desired. The yielding strips are for the purpose of resisting a vertically disposed weight on the seat. Each preferably comprises a wire of circular cross section, having substantially horizontally extending undulations. The strips are normally upwardly arched with the ends thereof preferably pivotally secured in the clips 17, although, as shown in the drawings, it is not necessary to close the clips around the ends of the strips since they do not have any tendency to come out of the clips. In the fabrication of the strips a force is produced by the tendency of the strips to curl, which is tremendously greater than the force which they resist when a weight rests on them.

The yielding strips preferably employed are of the type disclosed in Kaden Patent No. 2,002,399, issued May 21, 1935. During the manufacture of these strips the wire undulations are given a permanent arcuate set of comparatively small radius. The strips are thereafter extended from this normally small radius to a larger radius to conform to the desired arch of the seat. Thus, when a weight is disposed on the yielding strips a further enlargement of the radius is obtained, which is resisted by the small normal radius of set. Instead of yielding strips, other resilient means such as coil springs may be employed to provide the desired resiliency in the seat.

A substantially vertically extending back rest frame 20 is preferably formed of a substantially rectangular shape and comprises side bars 21 and 22, connected at the top by a cross bar 23. A second cross bar 24, shaped to fit the back, is positioned between the cross bars 21 and 22 adjacent the lower ends thereof. Clips are provided on the cross bars 23 and 24 and yieldable strips are secured to the clips. The back rest is substantially of the same width as the seat and is provided with the usual cushioning means, either over or in place of the yielding strips.

A pair of spaced uprights 25 are preferably fixed to the base 10, although they may be mounted independently of the base, but in fixed relationship thereto. Each of the uprights may comprise a sheet metal tower of substantially channel shape. Resilient means are disposed between the rigid uprights 25 and the back rest frame 20 for resisting rearward movement of the back rest frame and while permitting vertical movement thereof responsive to the movements of the yielding strips 19 or other resilient means employed.

Figure 6:
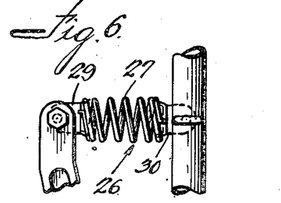
Fig. 6 is a side elevational view of the rocker spring assembly.
Figure 7:
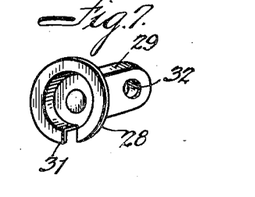
Fig. 7 is a perspective view of one of the arm elements of the rocker spring assembly shown in Fig. 6.

Such means may consist of a pair of rocker spring assemblies 26, shown more particularly in Figs. 1, 6 and 7 of the drawings. Each of the rocker spring assemblies comprises a coil spring 27 having the first two or more convolutions at each end close together providing threads in which are frictionally received spiral ramp flanges 28, the flanges being welded or otherwise fixedly secured to arms 29 and 30. The end of each spiral ramp flange is provided with a lip 31 which determines the extent to which the flange may be screwed into the coil spring, the lip abutting against the end of the spring. The lip 31 also determines the position of the bearing portions of the arms 29 and 30 so that they will be in alignment with each other, the arms being of polygonal cross section.

The arm 29 is disposed in a seat formed by the bifurcated upper end of each upright 25, being preferably secured in place by a pin or bolt passing through the bifurcated portion of the upright and through an opening 32 provided in the arm. The other arm 30 is seated between the side 21 of the back rest frame and a spaced mounting member 33 secured to the inner side thereof, being pivotally held in place by any suitable means such as a bolt or pin.

In order to provide synchronization of the back rest with the seat the side bars 21 and 22 of the back rest frame are provided at their lower extremities with forwardly extending members 34 and 35. These forwardly extending members may be integral with the side bars or they may be separately produced and then secured thereto. The forwardly extending members 34 and 35 may be rigidly connected to the back rest frame, although this is not necessary so long as vertical movement of the forwardly extending members causes the back rest frame to be likewise vertically moved.

Carried by the forwardly extending members 34 and 35 is a saddle member 36. The saddle member is preferably of flexible material such as canvas or the like and is of substantial width. In some cases rigid saddle members may also be suitable. The ends of the saddle member are preferably secured to the forwardly extending members 34 and 35 so that the saddle will overlie the yielding strips or other resilient means with the central portion of the saddle located substantially where the vertical movement of the resilient means is greatest. In use this normally would be directly under the person sitting on the seat. A flexible saddle member is preferred as it will shape itself to the seated person and yet command substantially accurate vertical movement of all parts of the seat.

Although the yielding strips 19 may all be the same distance above the base, it is preferable to have the two outer strips 19a and 19b raised above the other strips, and the upper side of the forwardly extending members 34 and 35 substantially level with the two outer yielding strips. With this arrangement the ends of the saddle, when the same is formed of flexible material, are bent around the forwardly extending members 34 and 35, under the two outer yielding strips and then back over the top thereof, as shown particularly in Fig. 2.

Bolts 37 may be inserted through the three layers of the saddle, the insertion being made inside and adjacent the loops of the yielding strips. As the loops alternate, the bolts will be staggered and when the nuts 38 are drawn down, there will be formed a depression around the loops. In this way a secure fastening of the back rest to the yielding strips is obtained which will prevent displacement. As the saddle is of substantial width, any tendency of the back rest to twist is minimized. It will be further noted that when flexible material is used in the saddle such as canvas or rubber, the undulations of the yielding strips will rest in pockets and be insulated against the abrasion of a metal to metal contact. Obviously any other suitable securing means may be employed. Thus, the saddle is attached not only to the forwardly extending members, but also to the two outer yielding strips, and if desired the saddle may also be attached to additional yielding strips.

It may also be desirable to mount the yielding strips somewhat as shown in Fig. 4. In this case if six yielding strips are employed, the two outer strips extend above all the others. The next two inner strips are somewhat lower and the two innermost strips are below all the others. This can be arranged by having the central portion 12a of the front rigid support formed in what might be termed a stair-step shape as is illustrated. The rear rigid support would be similarly shaped.

Whatever arrangement is employed, so long as the two outermost yielding strips are above the others, upon depression of the saddle member 36 the two outside yielding strips first retard this movement, and as the depression of the saddle is increased the other yielding strips are brought into play producing, in effect, what might be termed a selective action.

Due to the fact that the back rest frame and the forwardly extending members similarly move vertically, the yielding strips act to support the back rest frame, although the only connection between the yielding strips and said back rest frame is through the medium of the saddle member.

To maintain the forwardly extending members 34 and 35 in fixed spaced relationship a connecting bar 39 is positioned between the downwardly extending forward ends thereof and lies below the yielding strips. It is not connected or attached to the yielding strips.

In order to provide a finished appearance to the seat construction the uprights or towers 25, together with their associated mechanisms are enclosed. The cross bar 23 lies substantially to the rear of the general vertical plane of the side bars 21 and 22. A sheet 40 of fiber board, metal, or other substantially rigid material is fastened at one end thereof to the cross bar 23, the other end being secured to a substantially U-shaped bracket 41 extending laterally of the back rest frame, and being secured to the side bars thereof. Below the U-shaped bracket 41 a flexible covering member is used, which extends between the U-shaped bracket and the base 10.

Figure 5:
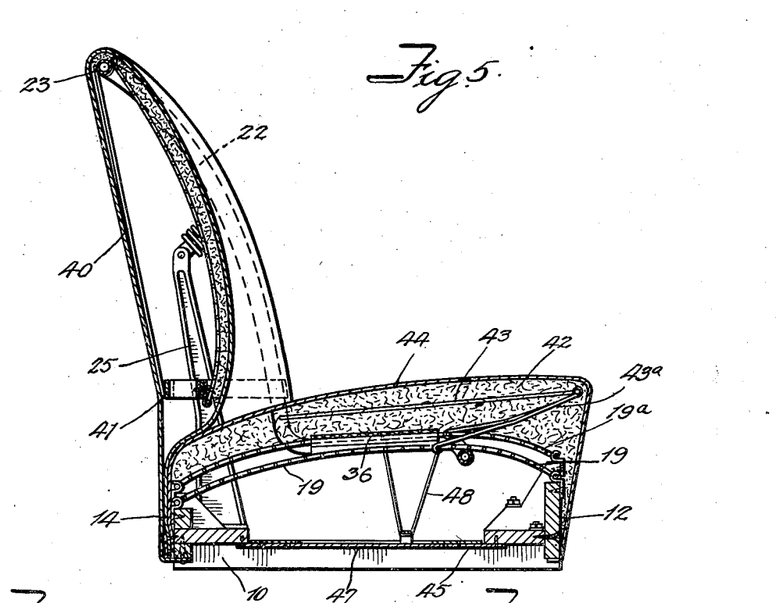
Fig. 5 is a cross sectional view of the seat construction shown in Fig. 1, but with the pad and trim in place.

A resilient pad 42 is disposed on the yielding strips 19 and extends forwardly of these strips to overhang or extend beyond the confines of the base 10. A frame 43 in the form of a wire extends forwardly of the side bars of the back rest frame and is substantially in the shape of the seat, although slightly smaller than said seat. The wire 43 is held in position by supporting wires 43a, which have their ends connected to the yielding strips 19. A covering 44 of any desired material such as leather, fabric or the like, extends over the pad 42 and downwardly over the side edges thereof to the base 10. The entire seat is thus trimmed in solid, except where the seat and back connection is made. Thus the covering provides air binding to act as a cushion to slow down the vertical movement of the seat.

Means are also employed to control the air escape from below the seat. For this purpose the base 10, which has a large central opening is provided with a preferably rigid covering member 45, which has a valve opening 46 therein. While various types of valves may be employed, that shown consists of a valve flap 47 preferably hinged to the lower side of the covering 45.

Thus, when the valve flap 47 is moved downwardly, air may escape from below the seat, and when the flap is against the cover 45, the valve is closed. To maintain the flap in normally closed position, a resilient supporting member 48 may be employed, one end of which is connected to the valve flap and the other to the yielding strips thereabove. With this arrangement, when the saddle and the resilient strips thereover are depressed, the pressure beneath the seat is increased, tending to open the valve flap 47 and at the same time the pull of the resilient member 48 is decreased, permitting the valve flap to move to open position under the force of the air. However, as soon as the saddle begins to rise again, the springs are raised and tension on resilient member 48 is increased, thereby automatically closing the valve flap. This results in retarding the natural rebound of the seat and makes its motion much smoother.

Figures 8, 13:
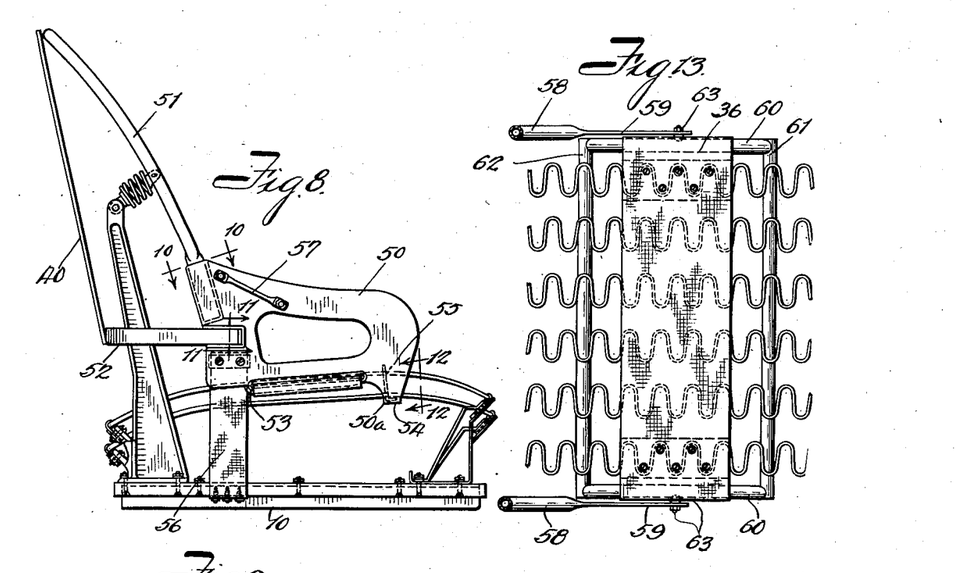
Fig. 8 is a side elevational view of a modified form of seat construction having side members which may serve as arm rests and with the ends of the saddle member attached to said side members.
Fig. 13 is a partial plan view of an additional form of seat construction wherein the sides of the back rest frame are pivotally connected to the forwardly extending saddle-carrying members.
Figures 9, 10, 11, 12, 14:
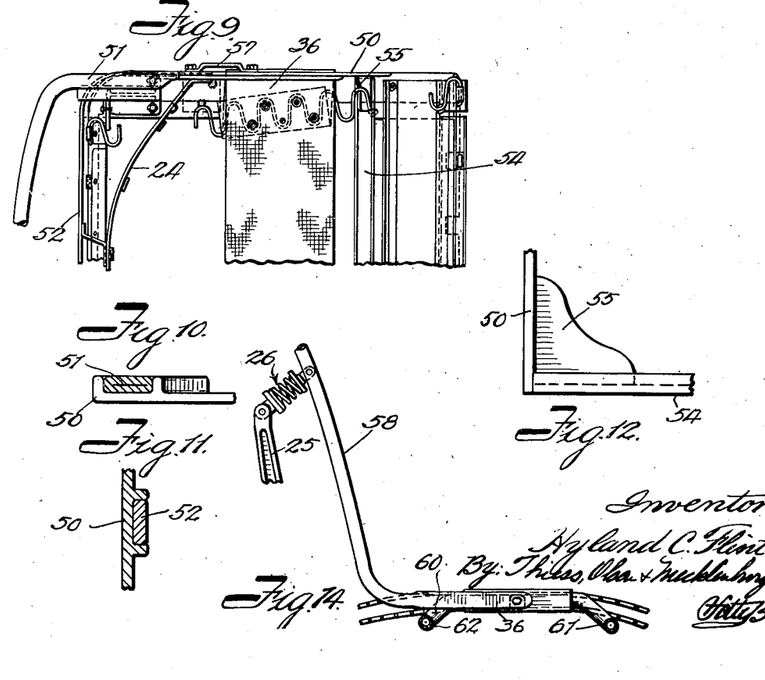
Fig. 9 is a top plan view of a portion of the seat shown in Fig. 8.
Fig. 10 is a cross sectional view taken on the line 10—10 of Fig. 8 showing the connection between one side of the back rest frame and the corresponding side member of the seat.
Fig. 11 is a cross sectional view taken on the line 11—11 of Fig. 8 showing the connection between one end of the U-shaped bracket and one of the side members of the seat.
Fig. 12 is a cross sectional view taken on the lines 12—12 of Fig. 8 showing the connection between the side members of the seat and the spacing bar therebetween.
Fig. 14 is a partial side elevational view of the seat construction illustrated in Fig. 13.

A modified type of seat construction is shown in Figs. 8 to 12. Instead of the forwardly extending members 34 and 35 previously described, side members 50 formed of a flat piece of metal, wood or other suitable material are employed. These serve as arm rests and also as a means of more securely holding the seated person from sliding sideways when the seat is used in a rough riding vehicle, such as a truck, tractor or tank. The sides, which are preferably castings, are of any desired shape with the upper edge of such height as to be substantially above the finished trimmed surface of the seat. The side members 51 of the back rest frame are flattened adjacent their lower ends and are then welded in depressions in the side members as shown in Fig. 10. The U-shaped bar 52 is also welded to the sides 50, as illustrated in Figs. 8 and 11.

In the lower portion of the side members there is provided a slot 53 to receive the saddle 10, the ends of which, after passing through the slots 53, are attached to the outer yielding strips as hereinbefore described. The side members 50 are shaped so that the front portion 50a thereof extends down below the lowermost yielding strips. A spacing member 54 extending below the yielding strips connects the two sides 50 of the seat together and holds them in spaced relation. The connection between the spacing strip 54 and the sides 50 is strengthened by a reinforcing member 55, attached to both the spacing member and the side as shown in Fig. 12. To prevent too great a rebound of the seat a limiting strip 56 is used, one end of the strip being connected to the base 10 and the other to the seat sides 50. If desired a safety belt may also be employed, being connected to bracket 57. The remainder of the construction of the seat shown in Fig. 8 is substantially that shown in Fig. 1.

Referring to Figs. 13 and 14, a further modification is shown. In this construction the sides 58 of the back rest frame are flattened adjacent their lower ends, as shown at 59, so that they may be pivotally connected to the saddle members 60 which lie adjacent the outer yielding strips. The ends of the saddle members 60 are bent downwardly as shown particularly in Fig. 14 so as to lie below the lowermost yielding strips, and they are rigidly spaced apart by cross members 61 and 62 which lie below said strips. The saddle 36 is attached to the forwardly extending members 60, as in the construction illustrated in Figs. 1 and 2. In the center of each of the forwardly extending members 60, there is attached a shoulder stud 63 which passes through the saddle material. The flattened portions of the back rest frame side members 58 are pivoted to the studs. As this pivotal connection is detachable the entire seat may be trimmed complete with a hole therein for the stud to pass through. This permits the back rest to be trimmed separately and then connected to the seat as the final operation. The back rest frame is held in position by the rocker spring assemblies 26 which are attached to the rigid uprights 25 as previously described.

By having the back rest pivotally connected to the forwardly extending members the saddle and its supporting frame may tilt independently of the back rest and thus relieve the saddle of strain caused by any change of angle of the back rest. By suitably pivoting the rigid uprights 25, the back rest frame may also be tilted forwardly with respect to the seat. While various modifications of the seat construction comprising this invention have been shown and described, it is to be understood that various other modifications and changes may be made without departing from the scope of the present invention. Therefore, I wish to be limited only by the prior art and the appended claims.

I claim:

1. In a device of the character described a plurality of substantially horizontally arranged, flat, resilient spring members for supporting a weight, a substantially vertically extending back rest frame, means for movably supporting said back rest frame for movement in a substantially vertical plane comprising forwardly extending members fixedly held in spaced relation to each other connected to said back rest frame and vertically movable therewith positioned adjacent said spring members, and a strip of fabric attached to and extending between the forwardly extending members and held in extended position thereby overlying a number of said flat spring members whereby said spring members support said fabric strip and said back rest frame.

2. In a device of the character described a plurality of substantially horizontally arranged, flat, resilient spring members for supporting a weight, a substantially vertically extending back rest frame, means for movably supporting said back rest frame for movement in a substantially vertical plane comprising forwardly extending members fixedly held in spaced relation to each other rigidly connected to said back rest frame and vertically movable therewith positioned adjacent said spring members, and a strip of fabric extending between and attached to the forwardly extending members and held in extended position thereby overlying a number of said flat spring members whereby said spring members support said fabric strip and said back rest frame.

3. In a device of the character described a plurality of substantially horizontally arranged, flat, resilient spring members for supporting a weight, a substantially vertically extending back rest frame, means for movably supporting said back rest frame for movement in a substantially vertical plane comprising forwardly extending members fixedly held in spaced relation to each other pivotally connected to said back rest frame and vertically movable therewith positioned adjacent said spring members, and a strip of fabric extending between and attached to the forwardly extending members and held in extended portion thereby overlying a number of said flat spring members whereby said spring members support said fabric strip and said back rest frame.

4. In a device of the character described a rigid support, a plurality of yielding strips for resisting a weight, extending substantially horizontally and having the opposite ends thereof fixed to said rigid support, a substantially vertically extending back rest frame, means for movably supporting said back rest frame for movement in a substantially vertical plane comprising forwardly extending members fixedly held in spaced relation to each other connected to said back rest frame and vertically movable therewith positioned adjacent said yielding strips, and a strip of flexible fabric extending between and attached to the forwardly extending members and held in extended position thereby overlying a portion of at least a majority of said yielding strips whereby said yielding strips support the fabric and the back rest frame.

5. In a device of the character described a rigid support, a plurality of yielding strips for resisting a weight, extending substantially horizontally and having the opposite ends thereof fixed to said rigid support, a substantially vertically extending back rest frame, means for movably supporting said back rest frame for movement in a substantially vertical plane comprising forwardly extending members fixedly held in spaced relation to each other connected to said back rest frame and vertically movable therewith positioned outwardly of and adjacent the yielding strips, and a strip of flexible fabric extending between and attached to the forwardly extending members and held in extended position thereby overlying at least a portion of said yielding strips whereby said yielding strips support the fabric and the back rest frame.

6. In a device of the character described a rigid support, a plurality of yielding strips for resisting a weight, extending substantially horizontally and having the opposite ends thereof fixed to said rigid support and extending from the front toward the rear thereof, a substantially vertically extending back rest frame, means for movably supporting said back rest frame for movement in a substantially vertical plane comprising forwardly extending members fixedly held in spaced relation to each other connected to said back rest frame and vertically movable therewith positioned outwardly of and adjacent the two outer yielding strips, and a strip of flexible fabric extending between and attached to the forwardly extending members and held in extended position thereby overlying at least a portion of said yielding strips whereby said yielding strips support the fabric and the back rest frame.

7. In a device of the character described a rigid support, a plurality of yielding strips for resisting a weight, extending substantially horizontally and having the opposite ends thereof fixed to said rigid support and extending from the front toward the rear thereof, a substantially vertically extending back rest frame, means for movably supporting said back rest frame for movement in a substantially vertical plane comprising, forwardly extending members fixedly held in spaced relation to each other connected to said back rest frame and vertically movable therewith positioned outwardly of and adjacent the two outer yielding strips, and a strip of flexible fabric extending between and attached to the forwardly extending members and held in extended position thereby overlying said yielding strips whereby said yielding strips support the fabric and the back rest frame.

8. In a device of the character described a rigid support, a plurality of yielding strips for resisting a weight, extending substantially horizontally and having the opposite ends thereof fixed to said rigid support and extending from the front toward the rear thereof, a substantially vertically extending back rest frame, means for movably supporting said back rest frame for movement in a substantially vertical plane comprising forwardly extending members fixedly held in spaced relation to each other connected to said back rest frame and vertically movable therewith positioned outwardly of and adjacent the two outer yielding strips, and a strip of flexible fabric extending between and attached to the forwardly extending members and held in extended position thereby overlying said yielding strips, said fabric being also connected to at least the two outer yielding strips whereby said yielding strips support the fabric and the back rest frame.

9. In a device of the character described a rigid support, a plurality of inner and outer yielding strips for resisting a weight, extending substantially horizontally and having the ends thereof fixed to said rigid support and extending from the front toward the rear thereof with the two outer yielding strips lying above the others, a substantially vertically extending back rest frame, means for movably supporting said back rest frame for movement in a substantially vertical plane comprising forwardly extending members fixedly held in spaced relation to each other connected to said back rest frame and vertically movable therewith positioned outwardly of and adjacent the two outer yielding strips, and a saddle member attached to the forwardly extending members and held in extended position thereby and overlying said yielding strips whereby said yielding strips bearing on the two outer strips before bearing on the inner strips support the saddle member.

10. In a device of the charatcer described a rigid support, a plurality of inner and outer yielding strips for resisting a weight, extending substantially horizontally and having the ends thereof fixed to said rigid support and extending from the front toward the rear thereof with the two outer yielding strips lying above the others, a substantially vertically extending back rest frame, means for movably supporting said back rest frame for movement in a substantially vertical plane comprising forwardly extending members fixedly held in spaced relation to each other connected to said back rest frame and vertically movable therewith positioned outwardly of and adjacent the two outer yielding strips, and a saddle member attached to the forwardly extending members and held an extended position thereby and overlying said yielding strips bearing on the two outer strips before bearing on the inner strips, said saddle member being also connected to at least the two outer yielding strips whereby said yielding strips support the saddle member.

11. In a device of the character described a rigid support, a plurality of inner and outer yielding strips for resisting a weight, extending substantially horizontally and having the ends thereof fixed to said rigid support and extending from the front toward the rear thereof with the inner yielding strips lying below the others, a substantially vertically extending back rest frame, means for movably supporting said back rest frame for movement in a substantially vertical plane comprising forwardly extending members fixedly held in spaced relation to each other connected to said back rest frame and vertically movable therewith positioned outwardly of and adjacent the two outer yielding strips, and a saddle member attached to the forwardly extending members and held in extended position thereby and overlying said yielding strips bearing on the two outer strips before bearing on the inner strips whereby said yielding strips support the saddle member.

12. In a device of the character described a rigid support, a plurality of yielding strips for resisting a weight, extending substantially horizontally and having the ends thereof fixed to said rigid support and extending from the front toward the rear thereof, a substantially vertically extending back rest frame, means for movably supporting said back rest frame for movement in a substantially vertical plane comprising side bars, and means for maintaining them in spaced relation, a forwardly extending member connected to each of said side bars and vertically movable therewith positioned outwardly of and adjacent the two outer yielding strips, and a saddle member comprising a thin pliable flexible substantially nonresilient stretcher-like membrane attached to the forwardly extending members and held in extended position thereby and overlying said yielding strips whereby said yielding strips support the saddle member.

13. In a device of the character described a rigid support, a plurality of yielding strips for resisting a weight, extending substantially horizontally and having the ends thereof fixed to said rigid support and extending from the front toward the rear thereof, a substantially vertically extending back rest frame, means for movably supporting said back rest frame for movement in a substantially vertical plane comprising side bars and means for maintaining them in spaced relation, a forwardly extending member connected to the lower extremity of each side bar and vertically movable therewith positioned adjacent said yielding strips, a saddle member comprising a thin pliable flexible substantially nonresilient stretcher-like membrane attached to the forwardly extending members and held in extended position thereby and overlying said yielding strips, and rigid means for maintaining said forwardly extending members fixed with respect to each other.

14. In a device of the character described a plurality of substantially horizontally extending yielding strips for supporting a weight, a substantially vertically extending back rest frame, means for movably supporting said back rest frame for movement in a substantially vertical plane comprising forwardly extending members forming the sides of the seat and extending substantially above said yielding strips connected to said back rest frame and vertically movable therewith, and a strip of flexible fabric extending between and attached to said side members and held in extended position thereby overlying a number of said yielding strips, whereby said yielding strips support said fabric, said side members, and said back rest frame.

15. In a device of the character described a rigid support, a plurality of yielding strips for resisting a weight, extending substantially horizontally and having the ends thereof fixed to said rigid support, a substantially vertically extending back rest frame, means for movably supporting said back rest frame for movement in a substantially vertical plane comprising forwardly extending members forming the sides of the seat and extending substantially above said spring members connected to said back rest frame and vertically movable therewith, said side members having slots therein substantially opposite the outermost yielding strips, and a saddle member attached to said side members through said slots and overlying said yielding strips whereby said yielding strips support the saddle member.

16. In a device of the character described a rigid support, a plurality of yielding strips for resisting a weight, extending substantially horizontally and having the ends thereof fixed to said rigid support, a substantially vertically extending back rest frame, means for movably supporting said back rest frame for movement in a substantially vertical plane comprising, forwardly extending members forming the sides of the seat and extending substantially above said spring members rigidly connected to said back rest frame and vertically movable therewith, spacing means extending below said yielding strips for holding said side members in fixed spaced relation, said side members having slots therein substantially opposite the outermost yielding strips, and a saddle member attached to said side members through said slots and overlying said yielding strips whereby said yielding strips support the saddle member.

17. In a device of the character described a plurality of resilient spring members for supporting a weight, a substantially vertically extending back rest frame, means for supporting said back rest frame for movement in a substantially vertical plane comprising side bars and means for maintaining them in spaced relation, forwardly extending members positioned outwardly of and adjacent said spring members, said back rest frame side members having a saddle frame pivotally connected thereto intermediate the ends of the frame, and a saddle member attached to said frame and overlying a number of said spring members whereby said spring members support the saddle member.

18. In a device of the character described, a plurality of yielding strips for resisting a weight, extending substantially horizontally and having the ends thereof fixed to said rigid support, a substantially vertically extending back rest frame, means for movably supporting said back rest frame for movement in a substantially vertical plane comprising forwardly extending members positioned outwardly of and adjacent said yielding strips, means extending below said yielding strips for maintaining said forwardly extending members in spaced relation, said back rest frame side members having a saddle frame pivotally connected to said forwardly extending members intermediate the ends of the frame, and a saddle member attached to said frame and overlying said yielding strips whereby said yielding strips support the saddle member.

19. The device recited in claim 1 wherein said fabric strip is also attached to at least one of said spring members.

20. The device recited in claim 1 wherein the spring members closest adjacent said forwardly extending members are vertically spaced above the other spring members and wherein said fabric strip is also attached to said first mentioned spring members.

21. The device recited in claim 1 wherein said resilient spring members comprise flat undulated wire.

22. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, and means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions.

23. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions, and a back rest secured to said stretcher-frame element to move therewith.

24. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions, and a back rest fixedly secured to said stretcher-frame element.

25. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions, a back rest secured to said stretcher-frame to move therewith, and means for maintaining said back rest in upright position.

26. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions, and a back rest pivotally secured to said stretcher-frame element.

27. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, and means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions, said membrane being secured to said membrane supporting portions adjacent the anchorage members.

28. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, and means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions, said spring elements comprising elongated bowed zigzag springs under longitudinal tension, with the zigzag portions juxtaposed with respect to the membrane to provide an extended bearing surface.

29. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions, a back rest secured to said stretcher-frame element to move therewith, and means for guiding said back rest in its movement comprising two swingable links secured to opposite sides of said back rest.

30. A spring seat comprising a spring structure having supporting spring elements having membrane supporting portions distributed in a generally horizontal plane, a stretcher-frame element adjacent said spring elements having two spaced membrane-anchorage members adjacent opposite edges thereof, respectively, and fixedly held in spaced relation to each other, means for supporting said stretcher-frame element on said spring elements comprising a thin pliable flexible substantially nonresilient stretcher-like membrane extending between said anchorage members and lying in a generally horizontal plane having opposite edge portions secured to said anchorage members and held in extended position thereby and its intermediate portion lying in a generally horizontal plane bearing on a number of said membrane supporting portions, a back rest secured to said stretcher-frame element to move therewith, and means for guiding said back rest in its movement comprising two swingable coil spring links secured to opposite sides of said back rest.

HYLAND C. FLINT.